Patented Aug. 15, 1950

2,518,963

UNITED STATES PATENT OFFICE 2,518,963

PRODUCTION OF THERMOSETTING ALDEHYDE REACTION PRODUCTS

Welcome I. Weaver, Huntington, Ind., assignor to Libbey-Owens-Ford Glass Company, Toledo, Ohio, a corporation of Ohio No Drawing. Application March 18, 1946, Serial No. 655,379

3 Claims. (Cl. 260—69)

The invention relates to the production of novel thermosetting synthetic resins.

Nearly all the known resins formed by the reaction of formaldehyde with various compounds are without practical value because of undesirable physical properties. Most of them are thermoplastic or so slowly thermosetting that they may be regarded for all practical purposes as thermoplastic.

Many substances whose molecule is an N-substituted urea molecule have been reacted with formaldehyde, and it has been found that such substances when reacted with formaldehyde almost invariably form thermoplastic rather than thermosetting resins.

The principal object of the invention is the production of a thermosetting resin by reaction of a N-substituted urea with formaldehyde. More specific objects and advantages are apparent from the description, which merely discloses and illustrates the invention and is not intended to impose limitations upon the claims.

The present invention is based upon the discovery that monomeric or partially polymerized N,N-ethylene urea

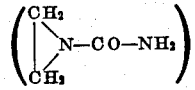

reacts with formaldehyde to form a thermosetting resin.

In the practice of the present invention monomeric or partially polymerized N,N-ethylene urea may be reacted either with formaldehyde or with a polymer thereof, such as paraformaldehyde. When used for this reaction, paraformaldehyde is considered to split up so that the substance actually taking part in the reaction with the monomeric or partially polymerized N,N-ethylene urea is formaldehyde. Preferably the monomeric or partially polymerized N,N-ethylene urea is reacted with a solution of formaldehyde in water, in an organic solvent such as an alcohol, or in a liquid containing both water and an organic solvent.

When a formaldehyde solution is used for the reaction with monomeric or partially polymerized N,N-ethylene urea, the solution is preferably about neutral at the start of the reaction, although the reaction may be carried out in an acid or alkaline solution. Since commercial aqueous formaldehyde solution is strongly acid, a base is preferably added to bring the initial pH of the reaction solution to the desired value. The base employed may be an organic base such as triethanolamine, an inorganic base such as sodium carbonate or sodium hydroxide, or any other base.

The proportion of formaldehyde actually reacting with each mole of N,N-ethylene urea may be one mole. An excess of either reactant may be used if desired, although an uncombined excess of one of the reactants usually is not desirable in the final product.

The reaction proceeds at ordinary temperatures, but is expedited by heating. An intermediate reaction product may be prepared by carrying the reaction only to its earliest stage, for example, the stage at which the reactants have just formed a common solution, or the reaction or condensation may be carried to any further stage (short of the final infusible resinous stage) at which the product may still be called an intermediate reaction product. For many purposes it is convenient to allow the soluble type of intermediate reaction product to remain in the form of a solution. Such a solution, after the addition of any desired ingredients, may be used as a binder in the production of impregnated or laminated products, as an adhesive, as a dressing or crease-proofing agent for textiles, as a paper-treating agent, as an ingredient for coating compositions, as a flame-proofing agent for wood, and as a composition to be converted into a foam that can be hardened to produce an insulating material.

An intermediate reaction product may be obtained in dry form from a solution by evaporating or diluting it with water, to adjust its concentration to the proper value, and then spray-drying or vacuum drum-drying. It usually is more convenient to ship or store an intermediate reaction product in dry form than in the form of a solution. Various ingredients, such as fillers, pigments and hardening catalysts, may be mixed with a dry intermediate reaction product so that a coating composition, adhesive, binder or impregnating agent may be obtained simply by adding water or other solvent to the dry mixture.

An acid catalyst may be used in hardening or converting the intermediate reaction product into an infusible resin. Since the action of such a catalyst is due solely to its acidity, any acid substance, such as an inorganic acid, an organic acid or an acid salt such as ammonium chloride or sulfate, may be used as the catalyst. The acidity may be furnished by mere addition of an acid substance to the intermediate reaction product, but acidity to catalyze the conversion of the intermediate reaction product to an infusible resin preferably is provided by incorporating a potential acid catalyst with the intermediate reaction product. A potential acid catalyst is a substance, which, after being added to the intermediate reaction product, remains substantially neutral so long as the reaction product is stored at ordinary temperatures, but decomposes or reacts to generate acidity when the intermediate reaction product is heated in the operation of converting it into an infusible resin. The degree of acidity employed during the hardening of the intermediate reaction product is simply that acidity which causes the intermediate reaction product to harden at the desired rate.

Fillers, plasticizers, hot-plate lubricants, opacifiers, dye stuffs, pigments and other coloring matter may be incorporated with the intermediate reaction product to produce a suitable molding composition. In the preferred method of preparing a molding composition, the filler is impregnated with a solution of a soluble intermediate reaction product, and the solvent is then removed. Fibrous cellulosic material in the form of paper pulp, wood flour or the like preferably is employed as the filler. Heat may be used to facilitate the drying of the impregnated cellulose or other filler. Of course, the drying temperature should not be sufficient to render the molding composition infusible. After the water or other solvent has been removed, the dry product may be ground in a ball mill to produce a homogeneous powder, and modifiers, such as plasticizers, lubricants and pigments, may be incorporated in the grinding operation. If desired, the powder may be compressed into blanks or preforms of the proper sizes for use in various molds. The molding composition may be employed in the usual manner for the production of molded articles by compressing it in a closed mold under a pressure of one to four tons per square inch of projected area and at a temperature between 100° C. and 200° C., preferably about 120-150° C., for a period of about one minute.

The preferred filler is alpha cellulose pulp, which is a very pure, white form of cellulose.

Articles of infusible resin embodying the invention may be produced by methods other than preparing and hot-pressing a molding composition, for example, by casting in open molds and baking. The intermediate reaction products that have been described may be incorporated with a great variety of other resins or potential resins. Also, reaction products of formaldehyde with mixtures of monomeric or partially polymerized N,N-ethylene urea with other substances may be produced. The intermediate reaction products in the resulting compositions may then be converted into the infusible resins, and a blend or copolymer of different resins may thus be obtained.

*Example*

An aqueous solution of 0.1 mole of potassium cyanate is added slowly to an aqueous solution of 0.1 mole of ethylenimine and 0.2 mole of hydrochloric acid. The solution is then evaporated by heating on a steam bath. The residue, which contains potassium chloride, is extracted with hot methanol. Evaporation of the methanol solution leaves a clear, viscous liquid, which is monomeric and partially polymerized N,N-ethylene urea. This substance is dissolved in a commercial 37 per cent aqueous solution of formaldehyde which contains about one mole of formaldehyde for each mole of N,N-ethylene urea. A sufficient amount of triethanolamine is added to lower the pH of the solution to about 7.6. After the resulting solution has been refluxed gently for about ten minutes, a sufficient amount of lactic acid is added to reduce the pH to about 5.2. The solution then is used to impregnate a quantity of alpha cellulose that is about equal in weight to the quantity of monomeric and partially polymerized N,N-ethylene urea used, and the impregnated alpha cellulose is dried by exposure to air at 125° F. for 45 minutes. The dried product is ground to a powder in a ball mill and is molded under a pressure of about two tons per square inch of projected area at a temperature of 125° C. for one to one and one-half minutes. A longer time at this temperature may cause blistering, but the composition may be molded for a short time at a higher temperature, such as 160° C. The molded product is hard and infusible. It is slightly flexible so that it may be used for molding threaded bottle caps that are to be stripped rather than unscrewed from the mold.

Various embodiments of the invention may be devised to meet various requirements.

Having described the invention, I claim:

1. A method of producing a synthetic resin that comprises reacting, in equimolecular proportions, formaldehyde and N,N-ethylene urea.

2. An intermediate reaction product of equimolecular proportions of formaldehyde and N,N-ethylene urea, capable of conversion into an infusible resin.

3. A resinous reaction product of equimolecular proportions of formaldehyde and N,N-ethylene urea.

WELCOME I. WEAVER.

REFERENCES CITED

The following references are of record in the file of this patent:

UNITED STATES PATENTS

| Number | Name | Date |
| --- | --- | --- |
| 2,208,290 | Glycofrides | July 16, 1940 |
| 2,327,760 | Bestian et al. | Aug. 24, 1943 |
| 2,373,136 | Hoover et al. | Apr. 10, 1945 |